US006345451B1

United States Patent
Arslanian et al.

(10) Patent No.: US 6,345,451 B1
(45) Date of Patent: Feb. 12, 2002

(54) METHOD AND APPARATUS FOR HOT CONTINUOUS FIBER COOLING WITH COOLING GAS RECIRCULATION

(75) Inventors: Gregory Khosrov Arslanian, Pipersville, PA (US); Michael Henry Evans, Antwerp (BE); Joseph Anthony Schillinger, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/535,672

(22) Filed: Mar. 23, 2000

(51) Int. Cl.[7] ................................................. F26B 7/00
(52) U.S. Cl. ................................................. 34/428
(58) Field of Search ......................... 34/428, 444, 448, 34/516, 570, 62, 92, 629, 635

(56) References Cited

FOREIGN PATENT DOCUMENTS

| EP | 0094172 | 7/1988 |
|----|---------|--------|
| EP | 0820963 | 9/1999 |
| EP | 0601601 | 12/1999 |
| JP | 6046954 | 3/1985 |
| JP | 4240129 | 8/1992 |
| WO | 9749960 | 12/1997 |

Primary Examiner—William Doerrler
Assistant Examiner—Malik N. Drake
(74) Attorney, Agent, or Firm—Willard Jones II (57) ABSTRACT

Coolant gas recovery and reuse from a heat exchanger is automatically interrupted when the oxygen content of the used gas exceeds a predetermined maximum concentration and is recommenced when the oxygen content falls below a predetermined minimum concentration. The mass flow of coolant gas introduced into the passageway is controlled independently of its composition and, during normal operation, the mass flow ratio of coolant gas withdrawn for recovery to coolant gas introduced into the heat exchanger is maintained constant. This ratio can be ramped up to the constant level in a predetermined manner on start up of fiber cooling and following recovery interruption. The invention provides both methods and apparatus and has particular application to Optical Fiber manufacture.

41 Claims, 2 Drawing Sheets

METHOD AND APPARATUS FOR HOT CONTINUOUS FIBER COOLING WITH COOLING GAS RECIRCULATION

TECHNICAL FIELD OF THE INVENTION

The present Application relates to the cooling of hot continuous fibers using a coolant gas and has particular, but not exclusive, application to the cooling of Optical Fibers with helium. It provides both methods of cooling and apparatus for cooling.

BACKGROUND OF THE INVENTION

The Optical Fiber industry faces increasing pressure to reduce manufacturing costs while maintaining the highest standards of product quality. A major part of the operating cost of an Optical Fiber production facility is taken up by utilities and, in an effort to reduce one expensive utility, attention has been directed to the cost of helium used as a heat exchange medium between the Optical Fiber as it passes vertically down the center of a draw tower and the externally cooled wall of the draw tower tube. In conventional Optical Fiber manufacture, all the helium supplied to the draw tower is allowed to escape to atmosphere through the open ends of the draw tower. It has been proposed in, for example, JP-A-60-046954, JP-A-4-240129 and EP-A-0094172 to recover and re-use the helium.

The level of technology involved in optical fiber manufacture is very high. The fibers are manufactured in a batch process with strict controls on diameter to micron levels. This requires a sophisticated level of control from the draw furnace, to fiber diameter measurement, fiber cooling, coating application and draw speed control. The optimum is to produce the longest single length of fiber with consistent diameter in the fastest possible time while maintaining the desired light transmissibility parameters. A significant challenge is found in starting the draw process; obtaining the maximum draw speed and stable operation as fast as possible. In view of the high level of control and the number of parameters that can effect the draw operation, recovering helium while maintaining stable operation presents a significant challenge. Changes affecting the efficiency of cooling in the draw tower can lead to off specification product, fiber breaks or coating problems which disrupt the fiber draw operation. It is economically sound to recover helium used in the draw process but not at the expense of increased production interruption and lost product. The final fiber product is worth much more than recovery of a utility gas, albeit an expensive one. Thus a stable, well defined, automated control system for helium recovery from an Optical Fiber manufacturing operation is required. This has not been satisfactorily achieved by the prior art proposals for helium reuse.

JP-A-60-046954 discloses a heat exchanger for cooling an Optical Fiber by contact with a helium or a helium/inert coolant gas mixture during passage through a passageway in a heat exchanger. The coolant gas is recirculated with addition of fresh helium and, when using a gas mixture, inert gas. The flow of the recirculated gas after said addition is controlled, in unspecified manner, by a valve and monitored by a flow meter. Optionally, the gas is cooled prior to entry into the passageway and/or the passageway is separately cooled.

JP-A-4-240129 acknowledges as prior art thereto a process of JP-A-60-046954 in which an Optical Fiber is cooled by direct contact with a helium/nitrogen gas mixture as it is passed through a heat exchanger passageway countercurrent to the direction of gas flow. The gas is recirculated with addition of fresh helium and nitrogen. The recirculated gas after said addition is cooled prior to entry into the passageway and/or the passageway is separately cooled. It is stated that a problem with the process of JP-A-60-046954 is the volume of helium required for cooling and the loss of helium gas and ingress of air at the ends of the heat exchanger passageway. JP-A-4-240129 seeks to overcome this problem by purifying the recycled helium to remove inter alia air which enters the heat exchanger passageway from the ends thereof. No details of flow control are provided.

In the embodiment of FIG. 1 of JP-A-4-240129, recycled helium gas is withdrawn from an upper outlet of the heat exchanger passageway and pumped to a helium gas purifier to remove air therefrom. Helium gas exiting the purifier is pumped to a gas mixer where make-up helium is added from a helium gas source. The resultant gas mixture is then supplied to a gas inlet at the bottom of the passageway.

The embodiment of FIG. 2 of JP-A-4-240129 differs from that of FIG. 1 thereof in that the wall of the heat exchanger passageway is cooled and the made-up recirculated helium is cooled prior to return to the passageway.

EP-A-0601601 discloses the recirculation of coolant gas from a heat exchanger having a passageway in which a hot continuous fiber is cooled with coolant gas and is particularly concerned with the cooling of Optical Fibers using helium. The flow of coolant gas into and out of the passageway is controlled based on one or more of the flow rate of, concentration of impurities in, and the pressure of recirculation coolant gas exiting the passageway. It is stated that the means for controlling the flow may be "at least one flow resistance means, such as valves, orifices, sintered filters, narrow pipes having smaller diameters than the recovery conduit or packed beds" and that "adjustment of the flow resistance means can be made manually or automatically based on the flow rate, pressure and/or composition of the coolant gas" or "the flow resistance means can be preset or pre-adjusted based on experience and calculation or based on the flow rate, pressure and/or composition of a coolant gas". The only exemplification in EP-A-0601601 of monitored impurity in the coolant gas is that of oxygen concentration.

EP-A-0094172 discloses recirculation of nitrogen or other inert gas to and from a drier in which a solvent is evaporated. The flow of exhaust inert gas from the drier is controlled in response to the flow rate from the drier outlet and the oxygen concentration in the drier. The recirculated inert gas is pumped to a condenser unit where solvent is removed and returned in part to the main body of the drier and in part to the ends of the drier as inert gas curtains. If the gas outlet pressure falls below a predetermined level, the gas flow to the pump is made up with recirculated gas from the condensation unit. The distribution and amount of recycled gas and provision of make-up inert gas is controlled in response to the flow rate through the gas outlet; the flow rate through the gas inlet; the solvent concentration in the drier; the oxygen concentration in the drier; and the pressure in the recirculated flow from the condensation unit.

EP-A-0820963 discloses the recycle of helium from the fiber drawing step and at least one of the deposition and consolidation steps in an Optical Fiber manufacturing process. The used helium from these steps is partially purified to a low level purity and recycled to the fiber drawing process and/or further purified and recycled to at least one of the deposition, consolidation and fiber drawing steps. In an exemplified embodiment, provision is made to automatically vent purified recycle helium as a waste stream if the level of oxygen, chlorine, hydrogen chloride and moisture contaminants in the partially or fully purified recycle helium exceed predetermined levels.

WO-A-9749960 discloses the recycle of helium from a consolidation step in an Optical Fiber manufacturing process. The used helium from this step is either purified to a high level purity for recycle to the consolidation step or partially purified to a low level for usage in fiber draw or other process steps and subsequent purification for recycle to the consolidation and, optionally, other process steps. Helium from the fiber draw or other process steps can be purified and recycled independently of the recycle of helium to the consolidation step. In the exemplified embodiments, provision is made to automatically vent used or purified recycle helium to scrubbers if contaminant levels in the used or purified helium exceed predetermined levels.

It is the primary object of this invention to provide a relatively simple and effective system for reusing helium gas in Optical Fiber manufacture which will cause the minimum affect on application to an existing draw tower operation using fresh helium. More particularly, it is an object to provide such a system which will not reduce the length, consistency of diameter, or light transmissibility parameters of fiber produced or the speed of production compared with the use of only fresh helium.

SUMMARY OF THE INVENTION

The present invention provides an improvement in cooling a hot continuous fiber by simultaneously passing the fiber through an open ended passageway of a heat exchanger located in an ambient oxygen-containing atmosphere; introducing into the passageway a coolant gas comprising recirculated purified coolant gas and fresh coolant gas; allowing a portion of used coolant gas to leave the passageway at said open ends to limit ingress of ambient atmosphere into the passageway; removing, purifying and recirculating to the passageway a portion of the used coolant gas; and monitoring the oxygen content of said removed portion. The improvement is that the mass flow of coolant gas introduced into the passageway can be controlled independently of its composition by providing for automatic interruption of the removal of used coolant gas for purification and recirculation when the oxygen content of the used coolant gas exceeds a predetermined maximum concentration until such time as the oxygen content falls below a predetermined minimum concentration.

In one presently preferred embodiment, the method of the invention comprises simultaneously passing the fiber at constant speed through an open ended passageway of a heat exchanger located in an ambient moisture- and oxygen-containing atmosphere; introducing into the passageway a coolant gas containing at least about 95% helium and comprising recirculated purified coolant gas and fresh helium; allowing a portion of used coolant gas to leave the passageway at said open ends to limit ingress of ambient atmosphere into the passageway; removing, drying and recirculating to the passageway a portion of the used coolant gas; and monitoring the oxygen content of said removed portion, wherein said removal of used coolant gas for purification and recirculation is automatically interrupted when the oxygen content of the used coolant gas exceeds a predetermined maximum concentration and recommenced when the oxygen content falls below a predetermined minimum concentration; and the mass flow of coolant gas introduced into the passageway is maintained independently of its composition.

In a presently more preferred embodiment, the method of the invention comprises simultaneously passing the fiber at constant speed through an open ended passageway of a heat exchanger located in an ambient moisture- and oxygen-containing atmosphere; introducing into the passageway a coolant gas containing at least about 95% helium and comprising recirculated purified coolant gas and fresh helium; allowing a portion of used coolant gas to leave the passageway at said open ends to limit ingress of ambient atmosphere into the passageway; removing, drying and recirculating to the passageway a portion of the used coolant gas; and monitoring the oxygen content of said removed portion, wherein the mass flow of used coolant gas removed for purification and recirculation during normal operation is maintained at about 90% of mass flow of the coolant gas introduced into the passageway but said removal of used coolant gas is automatically interrupted when the oxygen content thereof exceeds a predetermined maximum concentration and recommenced when the oxygen content falls below a predetermined minimum concentration; said removal of used coolant gas is by a vacuum pump drawing used coolant gas from more than one said passageway and controlled to maintain a constant suction pressure; the mass flow of said removed gas portion from each passageway is regulated by a respective mass flow controller which is located upstream of said pump and regulates mass flow more rapidly than the vacuum pump can respond to corresponding changes in pressure levels; said interruption of flow from each passageway is by a shut-off valve located between said respective mass flow controller and pump; and the mass flow of coolant gas introduced into the passageway is maintained independently of its composition and is controlled by regulation of the pressure of said introduced coolant gas using respective pressure regulators on the fresh helium gas and the recirculated coolant gas set to provide recirculated coolant gas in preference to fresh coolant gas.

The invention also provides an apparatus for cooling a hot continuous fiber by the improved method of the invention. The apparatus comprises:

a heat exchanger for location in an ambient oxygen-containing atmosphere and having an open ended passageway to receive the hot continuous fiber for passage therethrough;

inlet means for introducing into the passageway a coolant gas comprising recirculated purified coolant gas and fresh coolant gas at a mass flow independent of said coolant gas composition;

outlet means for removing a portion of used coolant gas from the passageway;

purifying means for purifying said removed portion of used coolant gas;

pumping means for recirculating said removed coolant gas portion from said outlet means to said inlet means via said purifying means;

oxygen analysis means for monitoring the oxygen content of said removed coolant gas portion;

recirculation flow control means for interrupting said removal of used coolant gas; and signal means for automatically activating said recirculation flow control means to interrupt said removal of used coolant gas when the oxygen content measured by said oxygen analysis means exceeds a predetermined maximum concentration and to recommence said removal when said measured oxygen content falls below a predetermined minimum concentration.

In a presently preferred embodiment, the apparatus of the invention comprises:

at least two heat exchangers for location in an ambient moisture- and oxygen-containing atmosphere, each exchanger having an open ended passageway to receive a respective hot continuous fiber for passage therethrough;

inlet means for individually introducing into each passageway a coolant gas comprising recirculated purified coolant gas and fresh coolant gas at a mass flow independent of said coolant gas composition and comprising respective pressure regulators on the fresh coolant gas and the recirculated coolant gas set to provide recirculated coolant gas in preference to fresh coolant gas;

respective outlet means for individually removing a portion of used coolant gas from each of the passageways;

purifying means for removing moisture from said removed portions of used coolant gas by freezing out the water content thereof;

pumping means for recirculating said removed coolant gas portions from said respective outlet means to said inlet means via said purifying means, said pumping means comprising a vacuum pump which is located upsteam of said purifying means, connected to the respective outlet means and controlled to maintain a constant suction pressure;

respective oxygen analysis means for individually monitoring the oxygen content of said removed coolant gas portions;

respective mass flow control means for individually maintaining constant during normal operation the ratio of the mass flow of used coolant gas removed by each outlet means to the mass flow of the coolant gas introduced into the respective passageway by said inlet means, each said mass flow control means comprising a mass flow controller upstream of said vacuum pump and regulating mass flow from the respective passageway more rapidly than the pump can respond to corresponding changes in pressure levels;

respective recirculation flow control means for individually interrupting said removal of used coolant gas from each passageway and comprising a shut-off valve located between said respective mass flow controller and said vacuum pump; and respective signal means for activating each said recirculation flow control means to automatically interrupt said removal of used coolant gas from the respective passageway when the oxygen content measured by the respective oxygen analysis means exceeds a predetermined maximum concentration and to recommence said removal when said measured oxygen content falls below a predetermined minimum concentration.

DETAILED DESCRIPTION OF THE INVENTION

According to one aspect of the present invention, there is provided an improvement in a method of cooling a hot continuous fiber comprising simultaneously passing the fiber through an open ended passageway of a heat exchanger located in an ambient oxygen-containing atmosphere; introducing into the passageway a coolant gas comprising recirculated purified coolant gas an d fresh cool ant gas; allowing a portion of used coolant gas to leave the passageway at said open ends to limit ingress of ambient atmosphere into the passageway; removing, purifying and recirculating to the passageway a portion of the used coolant gas; and monitoring the oxygen content of said removed portion, the improvement consisting in automatically interrupting said removal of used coolant gas for purification and recirculation when the oxygen content of the used coolant gas exceeds a predetermined maximum concentration; recommencing said removal when the oxygen content falls below a predetermined minimum concentration; and controlling the mass flow of coolant gas introduced into the passageway independently of its composition.

According to another aspect, the present invention provides an apparatus for cooling a hot continuous fiber by the method of the first aspect, said apparatus comprising:

a heat exchanger for location in an ambient oxygen-containing atmosphere and having an open ended passageway to receive the hot continuous fiber for passage therethrough;

inlet means for introducing into the passageway a coolant gas comprising recirculated purified coolant gas and fresh coolant gas at a mass flow independent of said coolant gas composition;

outlet means for removing a portion of used coolant gas from the passageway;

purifying means for purifying said removed portion of used coolant gas;

pumping means for recirculating said removed coolant gas portion from said outlet means to said inlet means via said purifying means;

oxygen analysis means for monitoring the oxygen content of said removed coolant gas portion;

recirculation flow control means for interrupting said removal of used coolant gas; and signal means for activating said recirculation flow control means to automatically interrupt said removal of used coolant gas when the oxygen content measured by said oxygen analysis means exceeds a predetermined maximum concentration and to recommence said removal when said measured oxygen content falls below a predetermined minimum concentration.

As mentioned previously, the invention has particular, but not exclusive application to the cooling of an Optical Fiber using helium. In such an application, maximum oxygen concentration permitted in the used gas typically will be about 2% and the minimum oxygen concentration typically about 1%. Preferably, the helium content of the coolant gas introduced into the passageway will be maintained within the range of about 95% to 100%.

Conveniently, the coolant gas is introduced into the passageway at about the mid-point thereof and the recirculation coolant gas removed at two locations each adjacent a respective open end of the passageway.

Usually, the speed of the fiber and the mass flow of introduced coolant gas will be maintained constant during normal operation. Additionally or alternatively, the ratio of the mass flow of used coolant gas removed for purification and recirculation to the mass flow of the coolant gas introduced usually will be maintained constant at, for example, about 90:100 during normal operation. The proportion of used coolant gas removed for purification and recirculation during start up or following flow interruption can be gradually increased up to said mass flow.

When the method of the invention is applied to the cooling of Optical Fibers using helium and for some other applications, it may be sufficient for the purification of the recirculated coolant gas to be simply removal of moisture. Especially in the case of the use of helium, the moisture removal conveniently is conducted by cooling the recirculated coolant gas to freeze out the water content thereof. Other contaminants, especially oxygen, can be removed by conventional techniques such as membrane separation or absorption.

Usually, the oxygen concentration in the recirculated coolant gas is measured in a sample stream of used coolant gas removed from the passageway but it could be measured in the passageway itself. During normal operation, the analyzed sample stream can be combined with the coolant gas removed for purification and recirculation to limit the loss of coolant gas.

It is preferred that the used coolant gas is removed for purification and recirculation by a vacuum pump upsteam of purification thereof. A mass flow controller can be located upstream of the pump to regulate the mass flow of the removed gas portion and a shut-off valve can be located between said mass flow controller and pump to interrupt and recommence recirculation in response to signals from the analyzer.

Usually Optical Fiber production involves the parallel supply to a plurality of draw towers (heat exchanger) of coolant gas from a common source and accordingly it is desirable that a coolant gas recirculation system should be able to separately recover used coolant gas from each draw tower but combine the recovered streams prior to purification thereof. In the method of the invention, this can readily and efficiently be achieved by using the same vacuum pump to draw used coolant gas from the passageways of more than one heat exchanger with independent interruption and mass flow regulation of used coolant gas removal from each passageway in response to the oxygen content of the used coolant gas from the respective passageway. Preferably, the pump is controlled to maintain a constant suction pressure and the respective mass flow controllers regulate mass flow from the respective passageways more rapidly than the pump can respond to corresponding changes in pressure levels. This difference in response times allows the mass flow controllers to operate with a defined pressure drop which can be optimized for the particular mass flow device to ensure that it operates within its optimum control range and hence maintain the control stability of the recovery system.

The addition of fresh coolant gas to recirculated purified used coolant gas to provide the coolant gas introduced into the passageway conveniently is controlled by regulation of the pressure of said introduced coolant gas using respective pressure regulators on the fresh coolant gas and the recirculated coolant gas set to provide recirculated coolant gas in preference to fresh coolant gas.

The invention is exemplified below with reference to the use of helium in the manufacture of Optical Fibers. However, it should be understood that both the method and apparatus aspects of the invention are generally applicable to the cooling of any hot continuous fiber with any coolant gas.

Figure 1:
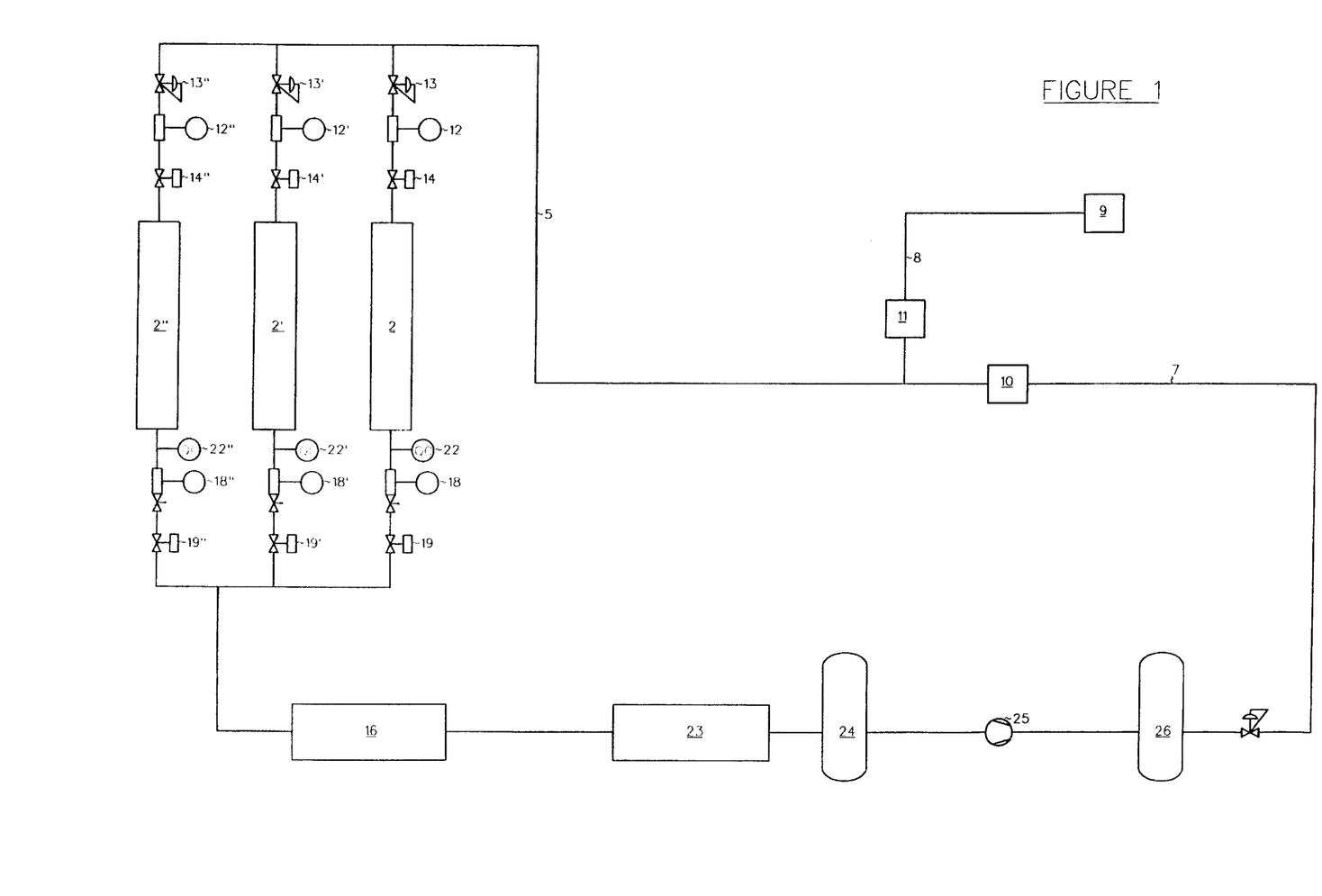
FIG. 1 is a schematic drawing of apparatus in accordance with a preferred embodiment of the present invention for cooling Optical Fibers using helium and FIG. 2 is a schematic drawing of a coolant control system for use in the apparatus of FIG. 1.

Referring to both Figures of the drawings, an Optical Fiber 1 (see FIG. 2) is drawn from a furnace (not shown) and cooled in a draw tower 2 prior to coating in conventional manner. The draw tower 2 is of essentially conventional structure consisting of a vertical right hollow cylindrical column wall 3 which is cooled externally with, for example, chilled water or a glycol/water system. The fiber 1 passes vertically down the center of a passageway 4 defined by the wall 3. A coolant gas in line 5 is introduced into the passageway 4 through an inlet 6, preferably at a mid-point of the draw tower 2. In normal operation, the coolant gas in line 5 consists of a mixture of recirculated coolant gas provided via line 7 from a storage tank 26 and make-up helium provided via line 8 from a pure helium gas supply 9. Composition of the coolant gas in line 5 is by regulation of the pressure in that line using respective pressure regulators 10,11 set to control at different pressure levels such that the recirculated coolant gas in line 7 is used in preference to make-up helium in line 8. It will be apparent that when there is no recirculated coolant gas, the coolant gas 5 consists entirely of pure helium provided from the gas supply 9.

Figure 2:
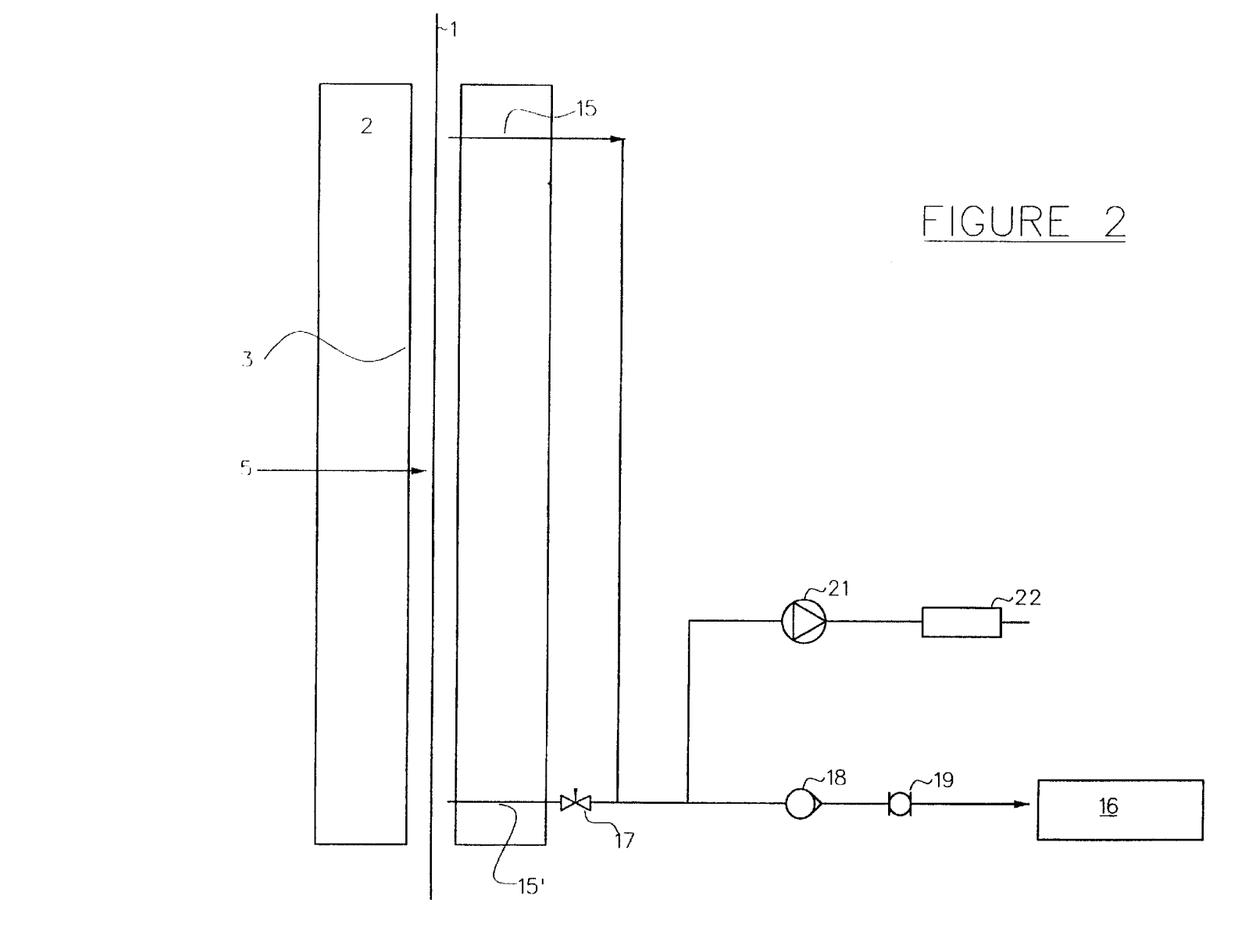

Under normal operating conditions, the mass flow of coolant gas into the draw tower 2 is fixed and is measured by a mass flow meter 12. The pressure is regulated by a pressure regulator 13 upstream of the mass flow meter 12 and a shut-off valve 14 is provided downstream of the mass flow meter 12 to open and close the inlet 6 to the draw tower 2.

The coolant gas acts as a heat exchange medium between the Optical Fiber 1 and the cylindrical wall 3 to cool the fiber as it passes through the passageway 4. In conventional draw towers, all of the helium supplied through inlet 6 exits the passageway 4 through the ends thereof preventing ingress of the ambient atmosphere into the passageway 4 and contamination by coolant gas recirculation. As acknowledged above, it is known in the prior art to remove a substantial portion of the coolant gas from outlets 15, 15' adjacent respective open ends of the passageway 4. The coolant gas in the draw tower 2 is maintained at a pressure slightly above atmospheric pressure to limit ingress of ambient atmosphere into the passageway 4 but the helium withdrawn through the outlets 15, 15' is nevertheless contaminated by the diffusion of components, particularly moisture and oxygen, from the ambient atmosphere. If the withdrawn contaminated helium was recirculated directly to the draw tower 2 with make-up fresh helium, the contaminant content would increase and thereby reduce the heat exchange capacity of the coolant gas. As acknowledged above, it is known in the prior art to remove contaminants from the withdrawn gas during recirculation to the draw tower 2.

In the present embodiment, the outlets 15, 15' are manifolded to a vacuum pump 16 which provides the driving force for recirculation and is controlled to maintain a constant suction pressure of, for example, 500 mbara. The flow through the two outlets 15, 15' is balanced by a single valve 17 controlling flow through one of the outlets 15'. The flow of withdrawn gas is controlled by a mass flow controller 18 upstream of the vacuum pump 16 and a shut-off valve 19 is provided between the mass flow controller 18 and the vacuum pump 16. The pump 16 reacts slower to changes in pressure level than the mass flow controller 18 is able to increase of control the mass flow rate of withdrawn gas to the pump.

In normal operation, the shut-off valve 19 is open allowing recirculation of the withdrawn gas and the mass flow controller 18 maintains the mass flow of the withdrawn gas at a constant proportion, for example 90%, of the mass of coolant gas supplied to the passageway 4 via line 5 through inlet 6. However, during the early stages of start-up of fiber production or during an interruption in gas recirculation (see below), the shut-off valve is closed preventing recirculation of withdrawn gas. On commencement of coolant gas recovery at a relevant stage during the start-up or on recommencement of recirculation following an interruption, the shut-off valve 19 is opened but the mass flow controller 18 controlled to ramp up the mass flow rate to the normal proportion over a predetermined time period and at a predetermined rate of mass flow increase. This allows time for the fiber cooling control system (not shown) to adjust to the increase in the temperature of the fiber 1 leaving the draw tower 2 resulting from the reduction in cooling efficiency due to decreasing helium content in the coolant gas supplied via line 5 as the proportion of recirculated gas increases. The fiber coating is temperature controlled and hence a step change in fiber temperature could cause the fiber coating to burn or break, or a section of off-specification fiber to be produced.

The mass flow controller 18 is calibrated for a mixture of 2% air in helium. If the helium concentration varies from 95% to 100% the error in flow reading on the mass flow controller is ±2%. Since this is approximately the same as the manufacturer's guaranteed error for flow measurement, which is ±2% of full scale, it has no impact on the accuracy of the control system. The measurement error is further reduced because of the use of flow ratio control. There is a relatively small composition difference between the coolant gas in line 5 and the recirculated coolant gas in line 7. The difference between the actual coolant gas composition and the coolant gas composition used to calibrate the mass flow devices has the same effect on the "true flow" measurement error of both the mass flow measuring devices. Using the ratio of these measured flows as the control variable cancels out the effect of the measurement error.

A sample of the withdrawn gas is removed upstream of the mass flow controller 18 and fed via pump 21 to analyzer 22 which constantly monitors the oxygen content of the withdrawn gas. Under normal operating conditions, the oxygen content remains below a predetermined maximum concentration of, for example, 2%. However, if the oxygen content exceeds that maximum concentration, a signal from the analyzer 22 causes the shut-off valve 19 to close thereby isolating the vacuum pump 16 and interrupting flow of the withdrawn gas to the vacuum pump 16. This interruption limits the proportion of withdrawn gas to that supplying the analyzer 22 and increases the flow of pure helium through line 8 and hence the helium content of the coolant gas supplied via line 5. The valve 19 remains closed until the oxygen concentration in the withdrawn gas detected by the analyzer 22 falls below a predetermined concentration of, for example, 1%.

When the valve 19 is open, the proportion of gas passing through the analyzer 22 can be added to the body of recirculated gas downstream of the vacuum pump 16. In this case, the set point of the mass flow controller 18 is adjusted to compensate for this addition to recirculated gas.

When the valve 19 is open, the withdrawn gas passes from the vacuum pump 16 to a purifier 23 for the removal of moisture and, optionally, oxygen and/or other contaminants. Preferably, moisture is removed by cooling the gas with, for example, liquid nitrogen to a temperature at which the moisture freezes out. Oxygen and other contaminants can be removed by conventional methods such as membrane separation or cryogenic absorption. However, in most Optical Fiber applications it will only be necessary to remove moisture from the recirculated coolant gas.

Recirculation gas from the purifier is passed to a first storage vessel 24 and then via compressor 25 to a second storage vessel 26 from which the recirculated supply is withdrawn via line 7.

As shown in FIG. 1, several draw towers 2, 2', 2" can be supplied via line 5 from a common source of coolant gas and can share a common recirculation circuit downstream of their respective shut-off valves 19, 19', 19". However, each draw tower 2, 2', 2" has independent coolant gas supply and withdrawal components as indicated in FIG. 1 by the absence or presence of the corresponding superscript. When coolant gas recovery from one of the draw towers is interrupted, there is enough hold up built into the vacuum manifold that the vacuum pump can slow down and return to control at a lower speed without major interruptions to helium recovery on other towers.

The present invention constitutes a significant improvement over prior art methods of reusing helium as the draw tower coolant in Optical Fiber manufacture. As described below, the present method is simpler and provides more stable coolant flow control than that of EP-A-0601601.

There is always a time delay between coolant helium entering the draw tower and exiting or being recovered at each end of the tower. As the recovery system recycles the coolant gas, the composition of the coolant gas changes until the system reaches a steady state where the difference in composition between inlet and recovered gas is constant, the recovered gas being complemented by the pure helium makeup gas to achieve the inlet flow and composition. Until this steady state is reached, the inlet mass flow controller of EP-A-0601601 continuously changes the mass flow to the draw tower depending on the composition of the coolant gas. Continuous changes in the inlet mass flow affects the cooling of the fiber as it passes through the draw tower and influences the fiber properties most noticeably diameter which is a key parameter for process control of the overall fiber manufacturing process. The time delay between the coolant gas entering the draw tower and being recovered and measured by the outlet mass flow device(s) and then controlled and the changing composition causes cyclic composition changes as the amount of coolant gas recovered cycles with changing gas composition. In a multi-draw tower operation, the influence of other draw towers on the inlet composition will possibly prevent the composition of the inlet and outlet coolant gas streams from ever achieving constant levels and may even affect the overall balance of control if the control system is not correctly tuned.

The use in the present invention of mass flow independent of inlet coolant composition minimizes the effects of composition change on process control. The affect of change of coolant composition on draw tower cooling efficiency is much slower than a change in inlet mass flow and hence has minimum affect on the control of the overall fiber manufacturing process.

It will be understood by those skilled in the art that the invention is not restricted to the specific details described above and that numerous modifications and variation can be made without departing from the scope and equivalence of the following claims.

What is claimed is:

1. In a method of cooling a hot continuous fiber comprising simultaneously passing the fiber through an open ended passageway of a heat exchanger located in an ambient oxygen-containing atmosphere; introducing into the passageway a coolant gas comprising recirculated purified coolant gas and fresh coolant gas; allowing a portion of used coolant gas to leave the passageway at said open ends to limit ingress of ambient atmosphere into the passageway; removing, purifying and recirculating to the passageway a portion of the used coolant gas; and monitoring the oxygen content of said removed portion, the improvement consisting in automatically interrupting said removal of used coolant gas for purification and recirculation when the oxygen content of the used coolant gas exceeds a predetermined maximum concentration; recommencing said removal when the oxygen content falls below a predetermined minimum concentration; and controlling the mass flow of coolant gas introduced into the passageway independently of its composition.

2. The method of claim 1 in which the fiber is an Optical Fiber and the fresh coolant gas is helium.

3. The method of claim 2 in which said maximum oxygen concentration is about 2% and the minimum oxygen concentration is about 1%.

4. The method of claim 2 in which the helium content of the coolant gas introduced into the passageway is maintained within the range of about 95% to 100%.

5. The method of claim 1 in which the speed of the fiber and the mass flow of introduced coolant gas is maintained constant during normal operation.

6. The method of claim 1 in which the coolant gas is introduced into the passageway at about the mid-point thereof and the used coolant gas removed for purification and recirculation is removed at two locations each adjacent a respective open end of the passageway.

7. The method of claim 1 in which the ratio of the mass flow of used coolant gas removed for purification and recirculation to the mass flow of the coolant gas introduced is maintained constant during normal operation.

8. The method of claim 7 in which said mass flow of used coolant gas removed for purification and recirculation is about 90% of mass flow of the coolant gas introduced.

9. The method of claim 1 in which the proportion of used coolant gas removed for purification and recirculation during start up is gradually increased up to a predetermined ratio of the mass flow of used coolant gas removed for purification and recirculation to the mass flow of the coolant gas introduced.

10. The method of claim 1 in which the proportion of used coolant gas removed for purification and recirculation following said interruption is gradually increased up to a predetermined ratio of the mass flow of used coolant gas removed for purification and recirculation to the mass flow of the coolant gas introduced.

11. The method of claim 1 in which said purification comprises removal of moisture.

12. The method of claim 11 in which the fiber is an Optical Fiber, the fresh coolant gas is helium, and moisture is removed by cooling the used coolant gas portion removed for recirculation to freeze out the water content thereof.

13. The method of claim 1 in which said purification comprises the removal of oxygen.

14. The method of claim 11 in which said purification further comprises removal of oxygen.

15. The method of claim 1 in which the oxygen concentration is measured in a sample stream of used coolant gas removed from the passageway.

16. The method of claim 15 in which, during normal operation, the sample stream is combined with the coolant gas removed for purification and recirculation.

17. The method of claim 1 in which the used coolant gas removed for purification and recirculation is removed by a vacuum pump upsteam of purification thereof; the mass flow of the removed gas portion is regulated by a mass flow controller upstream of said pump; and the flow is interrupted by a shut-off valve located between said mass flow controller and pump.

18. The method of claim 17 in which said pump draws used coolant gas from more than one said passageway with independent interruption and mass flow regulation of used coolant gas removal for purification and recirculation from each passageway in response to the oxygen content of the respective passageway.

19. The method of claim 18 in which said pump is controlled to maintain a constant suction pressure and the respective mass flow controllers regulate mass flow from the respective passageways more rapidly than the pump can respond to corresponding changes in pressure levels.

20. The method of claim 1 in which addition of fresh coolant gas to recirculated purified used coolant gas to provide the coolant gas introduced into the passageway is controlled by regulation of the pressure of said introduced coolant gas using respective pressure regulators on the fresh coolant gas and the recirculated coolant gas set to provide recirculated coolant gas in preference to fresh coolant gas.

21. A method of cooling a hot continuous Optical Fiber comprising simultaneously passing the fiber at constant speed through an open ended passageway of a heat exchanger located in an ambient moisture- and oxygen-containing atmosphere; introducing into the passageway a coolant gas containing at least about 95% helium and comprising recirculated purified coolant gas and fresh helium; allowing a portion of used coolant gas to leave the passageway at said open ends to limit ingress of ambient atmosphere into the passageway; removing, drying and recirculating to the passageway a portion of the used coolant gas; and monitoring the oxygen content of said removed portion, wherein said removal of used coolant gas for purification and recirculation is automatically interrupted when the oxygen content of the used coolant gas exceeds a predetermined maximum concentration and recommenced when the oxygen content falls below a predetermined minimum concentration; and the mass flow of coolant gas introduced into the passageway is maintained independently of its composition.

22. The method of claim 21 in which the ratio of the mass flow of used coolant gas removed for purification and recirculation to the mass flow of the coolant gas introduced is maintained constant during normal operation.

23. The method of claim 21 in which said mass flow of used coolant gas removed for purification and recirculation is about 90% of mass flow of the coolant gas introduced.

24. The method of claim 21 in which the proportion of used coolant gas removed for purification and recirculation following said interruption is gradually increased up to a predetermined ratio of the mass flow of used coolant gas removed for purification and recirculation to the mass flow of the coolant gas introduced.

25. The method of claim 21 in which the used coolant gas removed for purification and recirculation is removed by a vacuum pump upsteam of purification thereof; the mass flow of the removed gas portion is regulated by a mass flow controller upstream of said pump; and the flow is interrupted by a shut-off valve located between said mass flow controller and pump.

26. The method of claim 25 in which said pump draws used coolant gas from more than one said passageway with independent interruption and mass flow regulation of used coolant gas removal for purification and recirculation from each passageway in response to the oxygen content of the respective passageway.

27. The method of claim 26 in which said pump is controlled to maintain a constant suction pressure and the respective mass flow controllers regulate mass flow from the respective passageways more rapidly than the pump can respond to corresponding changes in pressure levels.

28. The method of claim 21 in which addition of fresh helium gas to recirculated purified used coolant gas to provide the coolant gas introduced into the passageway is controlled by regulation of the pressure of said introduced coolant gas using respective pressure regulators on the fresh helium gas and the recirculated coolant gas set to provide recirculated coolant gas in preference to fresh helium.

29. A method of cooling a hot continuous Optical Fiber comprising simultaneously passing the fiber at constant speed through an open ended passageway of a heat exchanger located in an ambient moisture- and oxygen-containing atmosphere; introducing into the passageway a coolant gas containing at least about 95% helium and comprising recirculated purified coolant gas and fresh helium; allowing a portion of used coolant gas to leave the passageway at said open ends to limit ingress of ambient atmosphere into the passageway; removing, drying and recirculating to the passageway a portion of the used coolant gas; and monitoring the oxygen content of said removed portion, wherein the mass flow of used coolant gas removed for purification and recirculation during normal operation is maintained at about 90% of mass flow of the coolant gas introduced into the passageway but said removal of used coolant gas is automatically interrupted when the oxygen content thereof exceeds a predetermined maximum concentration and recommenced when the oxygen content falls below a predetermined minimum concentration; said removal of used coolant gas is by a vacuum pump drawing used coolant gas from more than one said passageway and controlled to maintain a constant suction pressure; the mass flow of said removed gas portion from each passageway is regulated by a respective mass flow controller which is located upstream of said pump and regulates mass flow more rapidly than the vacuum pump can respond to corresponding changes in pressure levels; said interruption of flow from each passageway is by a shut-off valve located between said respective mass flow controller and pump; and the mass flow of coolant gas introduced into the passageway is maintained independently of its composition and is controlled by regulation of the pressure of said introduced coolant gas using respective pressure regulators on the fresh helium gas and the recirculated coolant gas set to provide recirculated coolant gas in preference to fresh coolant gas.

30. The method of claim 29 in which the proportion of used coolant gas removed for purification and recirculation following said interruption is gradually increased up to a predetermined ratio of the mass flow of used coolant gas removed for purification and recirculation to the mass flow of the coolant gas introduced.

31. An apparatus for cooling a hot continuous fiber comprising:
a heat exchanger for location in an ambient oxygen-containing atmosphere and having an open ended passageway to receive the hot continuous fiber for passage therethrough;
inlet means for introducing into the passageway a coolant gas comprising recirculated purified coolant gas and fresh coolant gas at a mass flow independent of said coolant gas composition.;
outlet means for removing a portion of used coolant gas from the passageway;
purifying means for purifying said removed portion of used coolant gas;
pumping means for recirculating said removed coolant gas portion from said outlet means to said inlet means via said purifying means;
oxygen analysis means for monitoring the oxygen content of said removed coolant gas portion;
recirculation flow control means for interrupting said removal of used coolant gas; and
signal means for activating said recirculation flow control means to automatically interrupt said removal of used coolant gas when the oxygen content measured by said oxygen analysis means exceeds a predetermined maximum concentration and to recommence said removal when said measured oxygen content falls below a predetermined minimum concentration.

32. The apparatus of claim 31 in which the inlet means introduces coolant gas into the passageway at about the mid-point thereof and the outlet means removes used coolant gas at two locations each adjacent a respective open end of the passageway.

33. The apparatus of claim 31 further comprising mass flow control means for maintaining constant during normal operation the ratio of the mass flow of used coolant gas removed by said outlet means to the mass flow of the coolant gas introduced by said inlet means.

34. The apparatus of claim 31 in which said purifying means removes moisture from the used coolant gas.

35. The apparatus of claim 34 in which the purifying means removes moisture by cooling the used coolant gas to freeze out the water content thereof.

36. The apparatus of claim 34 in which said purifying means also removes oxygen form the used coolant gas.

37. The apparatus of claim 33 in which the pumping means comprises a vacuum pump upsteam of said purifying means; said mass flow control means comprises a mass flow controller upstream of said pump; and the recirculation control means comprises a shut-off valve located between said mass flow controller and pump.

38. The apparatus of claim 37 in which said pump is connected to the outlet means of than one said passageway with independent interruption and mass flow regulation of used coolant gas removal from each passageway in response to the oxygen content of the respective passageway.

39. The apparatus of claim 37 in which said pump is controlled to maintain a constant suction pressure and the respective mass flow controllers regulate mass flow from the respective passageways more rapidly than the pump can respond to corresponding changes in pressure levels.

40. The apparatus of claim 31 in which the inlet means comprises respective pressure regulators on the fresh coolant gas and the recirculated coolant gas set to provide recirculated coolant gas in preference to fresh coolant gas.

41. An apparatus for cooling hot continuous Optical Fibers comprising:
at least two heat exchangers for location in an ambient moisture- and oxygen-containing atmosphere, each exchanger having an open ended passageway to receive a respective hot continuous fiber for passage therethrough;
inlet means for individually introducing into each passageway a coolant gas comprising recirculated purified coolant gas and fresh coolant gas at a mass flow independent of said coolant gas composition and comprising respective pressure regulators on the fresh coolant gas and the recirculated coolant gas set to provide recirculated coolant gas in preference to fresh coolant gas;
respective outlet means for individually removing a portion of used coolant gas from each of the passageways;
purifying means for removing moisture from said removed portions of used coolant gas by freezing out the water content thereof;

pumping means for recirculating said removed coolant gas portions from said respective outlet means to said inlet means via said purifying means, said pumping means comprising a vacuum pump which is located upsteam of said purifying means, connected to the respective outlet means and controlled to maintain a constant suction pressure;

respective oxygen analysis means for individually monitoring the oxygen content of said removed coolant gas portions;

respective mass flow control means for individually maintaining constant during normal operation the ratio of the mass flow of used coolant gas removed by each outlet means to the mass flow of the coolant gas introduced into the respective passageway by said inlet means, each said mass flow control means comprising a mass flow controller upstream of said vacuum pump and a mass flow controller for regulating mass flow from the respective passageway more rapidly than the pump can respond to corresponding changes in pressure levels;

respective recirculation flow control means for individually interrupting said removal of used coolant gas from each passageway and comprising a shut-off valve located between said respective mass flow controller and said vacuum pump; and respective signal means for activating each said recirculation flow control means to automatically interrupt said removal of used coolant gas from the respective passageway when the oxygen content measured by the respective oxygen analysis means exceeds a predetermined maximum concentration and to recommence said removal when said measured oxygen content falls below a predetermined minimum concentration.

\* \* \* \* \*